United States Patent

Castaigne

[11] 3,906,030
[45] Sept. 16, 1975

[54] AMINO ETHER DERIVATIVES OF ORTHOTHYMOTIC ESTERS

[75] Inventor: Albert Rene Castaigne, Toulouse, France

[73] Assignee: Centre d'Etudes pour l'Industrie Pharmaceutique, Toulouse, France

[22] Filed: July 5, 1973

[21] Appl. No.: 376,906

[30] Foreign Application Priority Data

July 20, 1972 France.............................. 72.26158

[52] U.S. Cl.. 260/471 R; 260/247.2 B; 260/293.82; 424/248; 424/267; 424/309
[51] Int. Cl.[2].................................. C07C 101/42
[58] Field of Search ................... 260/471 R

[56] References Cited
OTHER PUBLICATIONS

Finar, I. L., "Organic Chemistry", Vol. I, (1963), pub. by Richard Clay & Co., Great Britain, (QD251 F56), pp. 195 & 196 relied on.

*Primary Examiner*—Robert Gerstl
*Assistant Examiner*—L. A. Thaxton
*Attorney, Agent, or Firm*—Young & Thompson

[57] ABSTRACT

Amino ethers of the general formula:

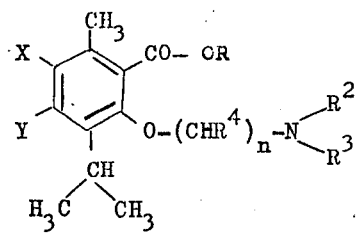

in which R is a lower alkyl radical having 1–4 carbon atoms, $R^2$ and $R^3$ which may be the same or different are hydrogen or a lower alkyl radical or, together with the nitrogen atom to which they are attached, form a heterocyclic ring optionally containing another heteroatom, $n$ is an integer from 1 to 4, $R^4$ is hydrogen or a lower alkyl radical, the various $R^4$'s not being necessarily identical when $n$ is higher than 1, X and Y are hydrogen or nitro, and their pharmaceutically acceptable salts.

They are useful, particularly, as diuretic, respiratory analeptic, cranial and peripheral vasodilatator, antiarrhythmic and antispasmodic drugs.

8 Claims, No Drawings

NEW AMINO ETHER DERIVATIVES OF ORTHOTHYMOTIC ESTERS

This invention relates to new ortho-thymotic acid derivatives, to a process for their preparation and to their applications, particularly in human and veterinary medicine.

The new compounds of this invention have the general formula:

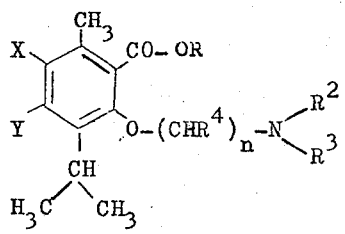

in which R is a lower alkyl radical having 1–4 carbon atoms, $R^2$ and $R^3$, which may be the same or different, are hydrogen or a lower alkyl radical having 1–6 carbon atoms or, together with the nitrogen atom to which they are attached, form a heterocyclic ring optionally containing another heteroatom, $n$ is an integer from 1 to 4, $R^4$ considered individually in each —(CHR$^4$)— radical is hydrogen or a lower alkyl radical having 1–6 carbon atoms, X and Y are hydrogen or nitro, and their pharmaceutically acceptable salts.

It is apparent from the preceding definition that the various symbols $R^4$ are not necessarily the same when $n$ is greater than 1.

Among the acid addition salts, there may be mentioned the salts formed with inorganic acids (hydrochloric, sulfuric, phosphoric acids) or organic acids (oxalic, citric, fumaric acids, and the like).

The invention includes also within its scope a process for the preparation of said derivatives, comprising reacting an ortho-thymotic acid, having the formula:

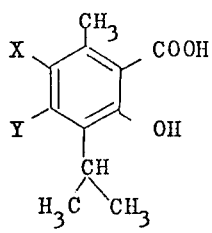

in which X and Y have the above defined meanings, with an esterifying agent having the formula $A(R)_a$ in which R has the above defined meaning, A is an anion and $a$ is the valence of said anion, to give the derivative of the formula (II)

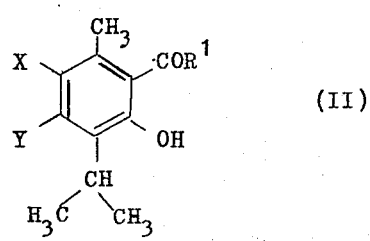

in which $R^1$ is OR, and then reacting derivative (II) with an aminoalkyl halide of the formula:

$$Z-(CHR^4)_n-N\begin{matrix}R^2\\R^3\end{matrix}$$

in which $R^2$, $R^3$, $R^4$ and $n$ have the above defined meanings and Z is halogen, and, if desired, salifying the resulting derivative of the formula (I).

The first step of the reaction uses ortho-thymotic acid or the 3-and/or 4-substituted derivatives of this acid when X and/or Y are other than hydrogen. Said substituted derivatives are readily obtained by nitration of ortho-thymotic acid, the nitro group or groups introduced being readily convertible to the amino and then to the halogeno group by a conventional reaction sequence.

As a modification, when it is desired to obtain derivatives of the formula (I) in which X and/or Y are other than hydrogen, ortho-thymotic acid (X + Y + H) may nevertheless be used in the first step and the desired substituents X and/or Y may then be introduced at a subsequent step by the above mentioned reaction sequence, particularly after esterification of ortho-thymotic acid.

Said esterification is advantageously effected with an alkyl sulfate. The reaction is preferably conducted within boiling acetone in the presence of sodium acid carbonate.

The reaction of the resulting derivative (II) with the aminoalkyl halide is effected by using the latter as the salt with the corresponding acid ZH. The reaction is preferably conducted within boiling acetone in the presence of potassium carbonate.

The resulting compounds of the formula (I) are isolated either as the free bases or as acid addition salts, or also as quaternary ammonium derivatives.

The following non limiting examples are given to illustrate the preparation of the compounds of this invention.

Examples A and B relate to the preparation of esters (II) used as raw materials in subsequent examples.

EXAMPLE A

Synthesis of methyl orthothymotate

To a two-necked flask provided with a mechanical stirrer and an ascending cooler with a calcium chloride tube overhead, are added 48.55 g (0.25 mole) ortho-thymotic acid, 35.28 g (0.28 mole) methyl sulfate, 25.2 g (0.30 mole) sodium acid carbonate and 200 ml anhydrous acetone.

The mixture is boiled during 15 hours, with continuous stirring.

After cooling, the solution is filtered and the filter is washed with acetone. The filtrate and washing liquors are evaporated in vacuo. The residue is dissolved in ether, washed with a saturated aqueous sodium acid carbonate solution and with water until neutral.

The ether phase is then separated, dried over sodium sulfate and evaporated. The resulting oily residue is then distilled in vacuo and the fraction distilling at 88°–89°C under 0.5 mm mercury is collected. Yield: 78%.

EXAMPLE B

Synthesis of ethyl orthothymotate

This ester is obtained as its methyl homolog (Example A) by mixing at first 48.55 g (0.25 mole) orthothymotic acid, 45.17 g (0.28 mole) ethyl sulfate and 25.2 g sodium acid carbonate in 200 ml anhydrous acetone.

The fraction distilling at 88°–89°C under 0.5 mm Hg is collected. Yield: 78%.

EXAMPLE 1

Synthesis of ethyl 2-(β-dimethylaminoethoxy)-3-isopropyl-6-methyl-benzoate (Compound (I), $R^1 = OC_2H_5$

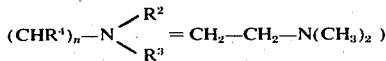

In a two-necked flask provided with a mechanical stirrer and an ascending cooler with a calcium chloride tube overhead, are mixed 33.14 g (0.15 mole) ethyl ortho-thymotate, 28.81 g (0.20 mole)

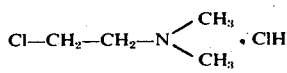

and 68.75 g anhydrous potassium carbonate (0.5 mole) in 300 ml anhydrous acetone.

Refluxing is maintained during 60 hours, with continuous stirring. After cooling, the solution is filtered, the residue is washed with acetone and the acetone liquors are evaporated to dryness. The residue is dissolved in 100 ml of N HCl, washed with ether and then made alkaline with 2N sodium hydroxide, after which it is extracted with ether. This latter ether phase is washed with water substantially saturated with sodium chloride, dried over anhydrous sodium sulfate and then concentrated in vacuo.

The resulting oil is distilled in vacuo and the fraction distilling between 118° and 122°C under 0.10 mm Hg is collected. Yield: 65%.

EXAMPLE 2

Synthesis of methyl 2-(α-methyl-β-dimethylaminoethoxy)-3-isopropyl-6-methyl-benzoate (Compound (I); $R^1 = OCH_3$;

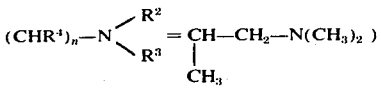

Under the same conditions as in the preceding example, 20.26 g (0.0974 mole) methyl ortho-thymotate, 20.1 g 2-chloro-1-dimethylamino-propane hydrochloride (0.127 mole) and 59.4 g anhydrous potassium carbonate (0.43 mole) are mixed in 200 ml acetone.

On distillation, the fractions distilling between 118° and 121°C under 0.1 mm Hg are collected. Yield: 54%.

EXAMPLE 3 a. Synthesis of methyl 5-nitro-ortho-thymotate

In a three-necked flask provided with a dropping funnel, a cooler and a magnetic stirrer, are dissolved 5 g (0.024 mole) methyl ortho-thymotate in 19 ml glacial acetic acid. The mixture is cooled externally by means of an ice bath. A mixture of nitric acid (2.7 ml; $d = 1.38$) in glacial acetic acid (19 ml) is added thereto, dropwise, and the reaction mixture is then left aside during 2 hours at room temperature, after which it is poured over crushed ice.

After filtration, washing with water, drying and recrystallization from petroleum ether, there are obtained 44 g (Yield 72%) methyl 5-nitro-ortho-thymotate having a melting point (Koefler block) of 70°–72°C.

b. Synthesis of methyl 2-(β-dimethylaminoethoxy)-3-isopropyl-6-methyl-5-nitro-benzoate.

To a three-necked flask provided with a cooler (provided overhead with a calcium chloride trap) and with a magnetic stirrer are added 20 g (0.079 mole) methyl 5-nitro-orthothymotate, 38.7 g (0.28 mole) anhydrous potassium carbonate, 14.3 g 2-chloro-1-N-dimethylamino-ethane hydrochloride (0.099 mole) and 200 ml acetone. The mixture is refluxed during 36 hours and is then filtered, the precipitate is washed with acetone and the filtrate is evaporated. Hydrochloric acid (100 ml) is added to the residue and the impurities are extracted with ether.

The aqueous phase is then made alkaline and extracted with ether. The ether extracts are washed with water, dried over anhydrous sodium sulfate, filtered and evaporated, to give 8.7 g of an oil. (Yield: 34%).

This oil is converted to the hydrochloride which is recrystallized from ethyl acetate-ethanol.

For indicative purposes: other derivatives of the formula (I) were prepared. The following Table summarizes the characteristics of the chief derivatives obtained.

The results of toxicological and pharmacological tests reported below demonstrate the useful activities of the derivatives of this invention, particularly their diuretic, respiratory analeptic, cranial and peripheral vasodilator, antiarrhythmic and antispasmodic activities.

Thus, this invention relates also to a therapeutic composition, having in particular diuretic, respiratory analeptic, cranial and peripheral vasodilatator, antiarrhythmic and antispasmodic actions, comprising, as active ingredient, a derivative of the formula (I) or a pharmaceutically acceptable salt thereof, and a pharmaceutically acceptable carrier.

I. TOXICOLOGICAL INVESTIGATION

The low toxicity and good tolerance of the derivatives of this invention are apparent from the data resulting from said investigation.

For indicative purposes, the LD 50/24 hrs, determined according to the method by Miller and Tainter in mice, for the intravenous route and per kg of body weight is 39 mg for derivative 1, 38 mg for derivative 2, 32 mg for derivative 3, 30 mg for derivative 4, 78 mg. for derivative 6, 38 mg for derivative 8 and 35 mg for derivative 10.

| Derivative no. | $(CHR^4)_n-N{\begin{smallmatrix}R^2\\R^3\end{smallmatrix}}$ | R | X | Y | B.p. °C 0.1 mm Hg | Yield % | Salt; m.p., °C |
|---|---|---|---|---|---|---|---|
| 1 | $CH_2-CH_2-N(CH_3)_2$ | $OCH_3$ | H | H | 119° | 47,7 | Hydrochloride 163°–165° |
| 2 | $CH_2-CH_2-N(CH_3)_2$ | $OC_2H_5$ | H | H | 118° 122° | 48 | Hydrochloride 179°–180° |
| 3 | $CH_2-CH_2-N(C_2H_5)_2$ | $OCH_3$ | H | H | 133° 134° | 45 | Hydrochloride 106°–108° |
| 4 | $CH_2-CH_2-N(C_2H_5)_2$ | $OC_2H_5$ | H | H | 120° 122° | 56 | oxalate 118° |
| 5 | $CH_2-CH_2-N\underset{}{\bigcirc}$ (piperidino) | $OCH_3$ | H | H | | 24 | Oxalate 179°–180° |
| 6 | $CH_2-CH_2-N\underset{}{\bigcirc}O$ (morpholino) | $OCH_3$ | H | H | | 58 | Hydrochloride 122°–124° |
| 7 | $CH_2-CH_2-N\underset{}{\bigcirc}O$ (morpholino) | $OC_2H_5$ | H | H | | 33 | Hydrochloride 166°–168° |
| 8 | $CH(CH_3)-CH_2-N(CH_3)_2$ | $OCH_3$ | H | H | 118 121° | 34 | Hydrochloride 95°–105° |
| 9 | $CH(CH_3)-CH_2-N(CH_3)_2$ | $OC_2H_5$ | H | H | | 36 | Hydrochloride 136°–138° |
| 10 | $CH_2-CH_2-CH_2-N(CH_3)_2$ | $OCH_3$ | H | H | 119° 120° | 67 | Hydrochloride 111°–113° |
| 11 | $CH_2-CH_2-N(CH_3)_2$ | $OCH_3$ | $NO_2$ | H | 208° 210° | 34 | Hydrochloride 208° |

By the oral route, the LD 50/24 hrs is above 300 mg for all the derivatives.

II. PHARMACOLOGICAL INVESTIGATION a. diuretic action

On oral administration to Wistar rats, at a dosage of 100 mg/kg, the compounds of this invention induce a marked increase of diuresis. This action is particularly noteworthy in the case of derivatives 1, 2 and 8.

b. respiratory analeptic action

The respiratory analeptic effect of derivatives 1, 3 and 10 is apparent from said investigation. On intravenous administration to rabbits at a dosage of 30 mg/kg, they produce a marked durable increase in the frequency of the respiratory motions.

c. cranial and peripheral vasodilatator action

The experimentation was conducted in rabbits: the derivatives of this invention were slowly injected by the intravenous route at a dosage of 10 mg/kg. The rheographic study shows an increased amplitude of the recording, corresponding to an increase of the blood rate of flow and reflecting a cranial and peripheral vasodilatation. Said action was apparent in the case of derivatives 3, 4, 6, and 8.

d. anti-arrhythmic action

On slow intravenous administration to rabbits, at a dosage of 5 mg/kg, derivatives 2 and 3 of this invention protect completely the test animals against barium chloride induced arrhythmia.

e. antispasmodic action

This investigation, carried out on the isolated organ, shows that derivatives 2 and 3 of this invention acting on the ileum of guinea-pig or the duodenum of rat submitted to the action of a contracture inducing agent (barium chloride, acetylcholine or histamine) produce a substantial decrease of the contractions.

The results of this investigation show that the derivatives of this invention possess diuretic, respiratory analeptic, cranial and peripheral vasodilatatory, antiarrhythmic and antispasmodic activities and that they may, therefore, constitute the active ingredient of a therapeutic composition valuable for use in human and veterinary medicine. The composition may be advantageously formulated for therapeutic use in the form of an injectable solution or of suppositories. It may also be formulated, for oral administration, as tablets, coated tablets, capsules, syrups and drops. Each unit dose may advantageously contain from 10 mg to 200 mg active ingredient and the daily dosage regimen may vary from 10 mg to 1000 mg depending on the route of administration and on the severity of the condition treated.

Non limiting examples of pharmaceutic formulations of the composition of this invention are given below.

| EXAMPLE 4. | TABLETS | |
|---|---|---|
| | Derivative no. 2 | 0.100 g |
| | Corn starch | 0.010 g |
| | Magnesium stearate | 0.005 g |
| | Talc | 0.002 g |
| | Polyvinyl pyrrolidone | 0.005 g |
| | Glucose | 0.010 g |
| EXAMPLE 5. | COATED TABLETS | |
| Core | Derivative no. 4 | 0.050 g |
| | Lactose | 0.010 g |
| | Magnesium stearate | 0.005 g |
| | Corn starch | 0.010 g |
| | Glucose | 0.010 g |
| | Gum arabic | 0.010 g |
| Coating | Shellac | 0.005 g |
| | Talc | 0.002 g |
| | White wax | 0.001 g |
| | Carnauba wax | trace |
| | Alcohol | 0.002 g |
| | Sugar q.s. for | 1 coated tablet |
| EXAMPLE 6. | CAPSULES | |
| | Derivative no. 10 | 0.100 g |
| | Magnesium stearate | 0.010 g |
| EXAMPLE 7. | SYRUP | |
| | Derivative no. 1 | 1 g |
| | Flavoured excipient, q.s. for | 100 ml |

| | -Continued | |
|---|---|---|
| EXAMPLE 8. | INJECTABLE SOLUTION | |
| | Derivative no. 6 | 0.020 g |
| | Isotonic solvent, q.s. for | 3 ml |
| EXAMPLE 9. | SUPPOSITORIES | |
| | Derivative no. 3 | 0.050 g |
| | Semi-synthetic glycerides, q.s. for 1 suppository | |

The composition of this invention may be efficiently administrated for therapeutic purposes.

By inducing substantial liquid depletions, by stimulating the vital control centers of the respiratory function, by regulating the rhythm of the heart muscle and by normalizing its stimulability, by permitting improved cranial and peripheral oxygenation and by increasing the blood rate of flow, it constitutes a choice medication for the treatment of cardiovascular conditions.

In addition, in view of its antispasmodic action, it lifts the spams of the unstriated muscle fibres and alleviates the urogenital, intestinal or biliary pains.

Having now described my invention what I claim as new and desire to secure by Letters Patent is:

1. A compound selected from the amino ether derivatives of ortho-thymotic esters of the formula:

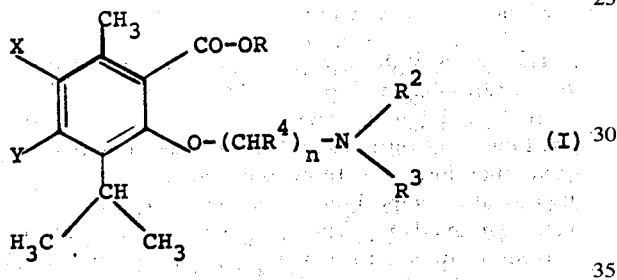

in which R is selected from the lower alkyl radicals having 1–4 carbon atoms; $R^2$ and $R^3$ are individually selected from hydrogen and the lower alkyl radicals having 1–6 carbon atoms; n is an integer from 1 to 4; $R^4$ considered individually in each radical —$(CHR^4)$— is selected from hydrogen and the lower alkyl radicals having 1–6 carbon atoms; and X and Y are each selected from hydrogen and nitro; and their pharmaceutically acceptable acid addition salts.

2. Methyl 2-($\beta$-dimethylaminoethoxy)-3-isopropyl-6-methylbenzoate and its hydrochloride.

3. Ethyl 2-($\beta$-dimethylaminoethoxy)-3-isopropyl-6-methylbenzoate and its hydrochloride.

4. Methyl 2-($\beta$-diethylaminoethoxy)-3-isopropyl-6-methylbenzoate and its hydrochloride.

5. Methyl 2-($\alpha$-methyl-$\beta$-dimethylaminoethoxy)-3-isopropyl-6-methyl-benzoate and its hydrochloride.

6. Ethyl 2-($\alpha$-methyl-$\beta$-dimethylaminoethoxy)-3-isopropyl-6-methyl benzoate and its hydrochloride.

7. Methyl 2-($\gamma$-dimethylaminopropoxy)-3-isopropyl-6-methyl-benzoate and its hydrochloride.

8. Methyl 2-($\beta$-dimethylaminoethoxy)-3-isopropyl-6-methyl-5-nitro benzoate and its hydrochloride.

* * * * *